United States Patent [19]
Jones et al.

[11] Patent Number: 5,902,211
[45] Date of Patent: May 11, 1999

[54] AUTOMATIC CONTROL SYSTEM FOR A MOTOR VEHICLE CLUTCH

[75] Inventors: Charles John Jones, Coventry; Ian Duncan Kennedy, Leamington Spa, both of United Kingdom

[73] Assignee: Automotive Products, plc, Leamington Spa, United Kingdom

[21] Appl. No.: 08/532,698

[22] PCT Filed: Feb. 10, 1995

[86] PCT No.: PCT/GB95/00267

§ 371 Date: Sep. 29, 1995

§ 102(e) Date: Sep. 29, 1995

[87] PCT Pub. No.: WO95/22014

PCT Pub. Date: Aug. 17, 1995

[30] Foreign Application Priority Data

Feb. 12, 1994 [GB] United Kingdom .................. 9402729

[51] Int. Cl.⁶ .................................................. F16H 61/18
[52] U.S. Cl. ...................... 477/125; 192/30 W; 477/116; 477/174
[58] Field of Search ................................... 477/125, 174, 477/176, 177, 180, 116; 192/3.63, 30 W

[56] References Cited

U.S. PATENT DOCUMENTS

| 4,403,683 | 9/1983 | Takano ................................ 192/30 W |
| 4,583,171 | 4/1986 | Hara et al. ............................... 477/125 |
| 4,651,142 | 3/1987 | Klatt ...................................... 192/30 W |
| 4,722,426 | 2/1988 | Bellanger .............................. 192/30 W |
| 4,922,769 | 5/1990 | Tury ....................................... 477/125 |
| 5,416,698 | 5/1995 | Hutchison .............................. 477/125 |

FOREIGN PATENT DOCUMENTS

| 0137247 | 4/1985 | European Pat. Off. . |
| 0595712 | 10/1993 | European Pat. Off. . |
| 3624008 | 1/1988 | Germany . |
| 4124722 | 1/1993 | Germany . |
| 2265958 | 10/1993 | United Kingdom . |

*Primary Examiner*—Charles A Marmor
*Assistant Examiner*—Sherry Lynn Estremsky
*Attorney, Agent, or Firm*—Paul E. Milliken; Lee A Germain

[57] ABSTRACT

A clutch control system for the automatic control of a motor vehicle clutch which connects an engine with a gearbox under the control of a driver operated gear ratio selector lever. The control system controls both initial clutch take-up on starting of the vehicle, clutch re-engagement following each ratio change, clutch disengagement on movement of the gear selector lever to change the operative ratio of the gearbox, and clutch disengagement on the coming to rest of the vehicle. The clutch control system also warns the driver if he attempts to drive away in a designated non take-up gear or in any gear in a predetermined abusive manner and may be arranged to promote rapid engagement or disengagement of the clutch in certain abusive conditions to reduce energy generation in the clutch.

14 Claims, 2 Drawing Sheets

AUTOMATIC CONTROL SYSTEM FOR A MOTOR VEHICLE CLUTCH

FIELD OF THE INVENTION

This invention relates to a clutch control system for the automatic control of a motor vehicle clutch which connects an engine with a gearbox under the control of a driver-operated gear ratio selector lever, the control system controlling both initial clutch take-up on starting of the vehicle, clutch re-engagement following each ratio change, clutch disengagement on movement of the gear selector lever to change the operative ratio of the gearbox, and clutch disengagement on the coming to rest etc. of the vehicle. Such a clutch control system is herein after referred to as a clutch control system of the kind specified.

BACKGROUND OF THE INVENTION

Examples of such systems are described in the Applicants earlier patents Nos. 0038113, 0043660, 0059035 and 0101220 and European Application No. 0566595.

It is an object of the present invention to provide an improved form of clutch control system of the kind specified in which abusive use of the system by the operator is mitigated.

Thus according to the present invention there is provided a clutch control system of the kind specified in which the operator is warned, for example by sounding a buzzer and/or flashing a warning light, if he attempts to drive away in a designated non take-up gear or in any gear in a predetermined abusive manner.

Typically in a vehicle with a five speed gearbox an attempt to drive away in a non take-up gear is designated as an attempt to drive away in third, fourth or fifth with a vehicle speed below a predetermined level (e.g. 4 kph).

Typically an attempt to drive away in an abusive manner is defined as an attempted clutch take-up in second gear with a high engine speed (e.g. over 3500 rpm) and a low vehicle speed (e.g. below 4 kph).

Take up is also defined as abusive if it is estimated that more than a first predetermined level of energy (e.g. 40 kJ) remains dissipated in the clutch.

The control system may also be arranged to estimate the energy dissipated in the clutch in each individual clutch take-up and to warn of abuse if the energy dissipated in any individual take-up exceeds a second predetermined level (eg. 30 kJ).

The level of energy dissipated in the clutch is estimated by:

determining the clutch slip speed from the difference between engine speed and clutch driven plate speed;

estimating the instantaneous torque capacity of the clutch from the position of the clutch actuator using a look-up table;

determining the instantaneous power being dissipated in the clutch from the product of the slip speed and torque capacity;

integrating the instantaneous power dissipated over the time period under consideration (e.g. the individual take-up or since keying on of the system) to estimate the total energy generated and subtracting periodically from this integration total an amount of energy representative of the natural cooling of the clutch to arrive at a current final total level of energy dissipated within the clutch during the time period under consideration.

In a clutch control system of the kind specified in which the level of clutch engagement is controlled by an electronic control unit in response to an engine speed error signal derived from a comparison of current engine speed and a reference speed signal generated by the control unit, said error signal being compared with a current clutch position signal to produce a clutch actuation signal, an additional control on clutch abuse is provided if an attempt is made to move away in a non take-up gear by not allowing the reference signal to increase above a predetermined level (e.g. 1100 rpm), or reducing the reference signal, as the throttle is opened. This containment of the reference signal may be extended to take-up in second gear, if desired. By not increasing the reference signal this ensures a more rapid clutch engagement thus reducing energy generation in the clutch.

In an alternative configuration the system may be configured to rapidly disengage the clutch to prevent the dissipation of excessive energy in the clutch. This rapid disengagement may be achieved by rapidly raising the value of the reference signal.

SUMMARY OF THE INVENTION

A clutch control system for the automatic control of a motor vehicle clutch which connects an engine with a gearbox under the control of a gear ratio selector lever operated by a driver in a vehicle, the control system controlling both initial clutch take-up on starting of the vehicle, clutch re-engagement following each ratio change, clutch disengagement on movement of the gear selector lever to change the operative ratio of the gearbox, and clutch disengagement on the coming to rest of the vehicle, the improvement comprising: means to warn the driver of an attempt to drive away in any gear in an abusive manner determined by when the energy generated in an one particular take up is estimated to be above a predetermined level.

BRIEF DESCRIPTION OF THE DRAWINGS

One embodiment of the present invention will now be described, by way of example only, with reference to the accompanying drawings in which.

DESCRIPTION OF THE PREFERRED EMBODIMENTS

Figure 1:
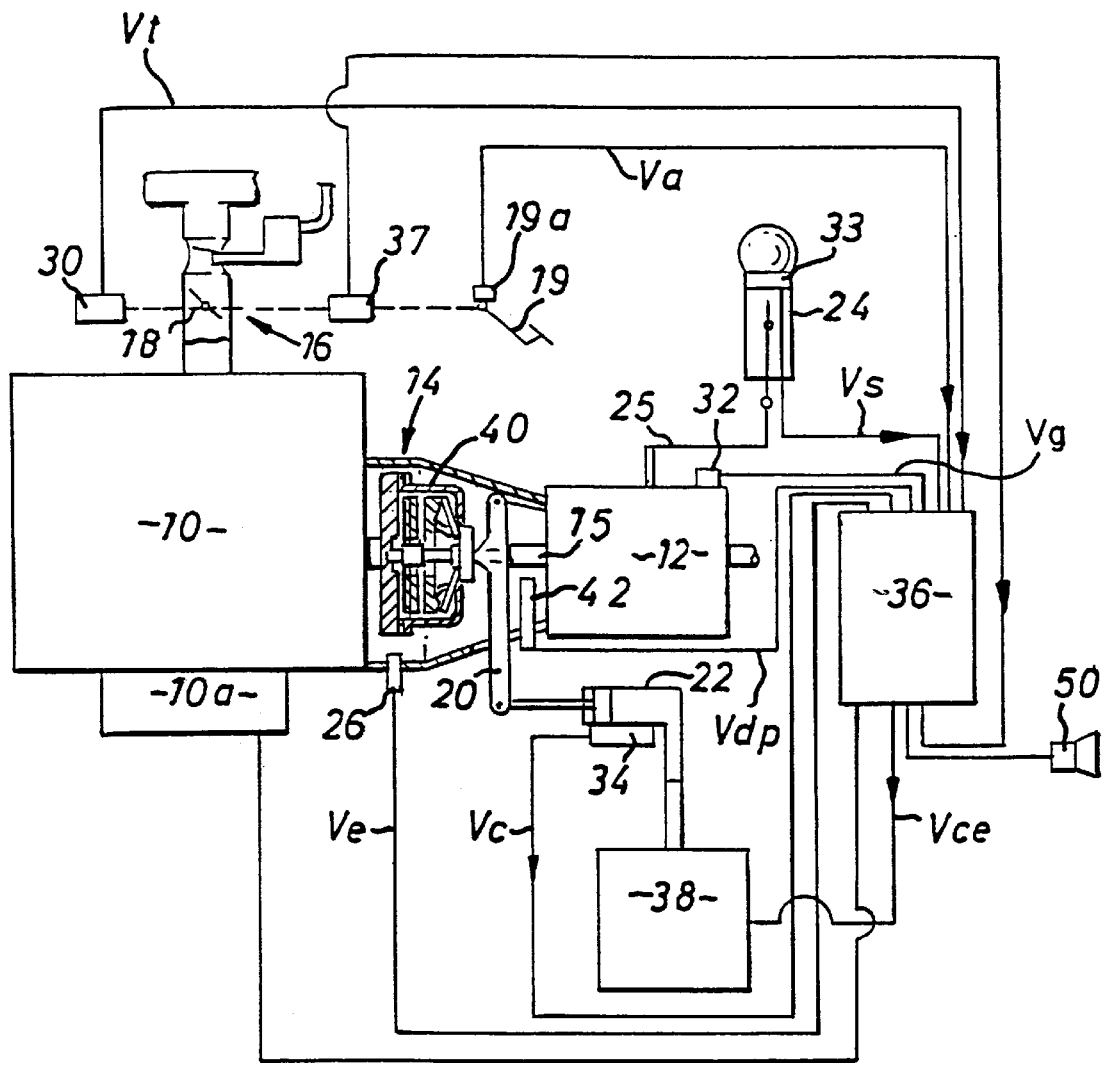
FIG. 1 shows in diagrammatic form the general layout of a control system of the kind specified embodying the present invention.

Referring to FIG. 1 this shows an engine 10 with a starter and an associated starter circuit 10a which is coupled through a friction clutch 14 with a gearbox 12 via a gearbox input shaft 15. In the example described, fuel is supplied to the engine by a throttle 16 which includes a throttle valve 18 operated by accelerator pedal 19. The invention is equally applicable to electronic or mechanical fuel injected petrol or diesel engines.

The clutch 14 is actuated by a release fork 20 which is operated by a slave cylinder 22. The gearbox is controlled by a gear ratio selector lever 24 which is connected with the gearbox via a selector linkage 25 and which includes a load-sensing switch means 33 which detects forces applied to the lever 24 by the driver and produces a signal Vs indicating an intention to change gear.

An electronic control unit 36 controls the actuation of the clutch 14 via an hydraulic control 38 which controls the operation of slave cylinder 22. Control unit 36 receives signals Vs from gear lever 24 and signals Ve proportional to engine speed from engine speed sensor 26. Signals Vt from throttle valve position sensor 30 proportional to the current throttle opening and accelerator pedal position signals Va from an accelerator position sensor 19a are also fed to control unit 36. Control unit 36 also receives a gear signal Vg from gear position sensor 32 which corresponds to the gear ratio currently engaged, signals Vc from slave cylinder position sensor 34, which varying with the position of the slave cylinder, and signals Vdp proportional to clutch driven plate speed from speed sensor 42 which actually senses the speed of the gearbox input shaft 15 (which is equal to that of a driven plate 40 of the clutch 14). Since the speed of the vehicle depends on the driven plate speed and the gear engaged, the driven plate speed sensor 42 acts in effect as a vehicle speed sensor and vice versa. Thus in some applications no driven plate speed sensor 42 is provided and this speed is calculated from the gearbox ratio and the vehicle speed which is given by a vehicle speed sensor (not shown) of, for example, the variable reluctance type.

A throttle control 37 is operated by the control unit 36 so that the throttle can be opened and closed independently of the accelerator pedal 19.

A buzzer 50 is connected with control unit 36 to warn/indicate to the vehicle operator when certain vehicle operating conditions occur. In addition to or in place of buzzer 50 a flashing warning light (not shown) may be used.

Control unit 36 includes a reference signal generator which generates a reference signal Vr representative of a desired engine speed. This reference signal is compared with the actual engine speed signal Ve to produce an error signal E which is compared with the clutch actuator position signal Vc to provide a clutch engagement control signal Vce which control unit 36 outputs to hydraulic control 38. Operation of a control unit in this manner is described in more detail, for example, in the Applicants earlier European Patents 0038113 and 0043660. Since the general details of the control logic of the control unit 36 do not form part of the present invention further details will not be given here but the reader is directed to the applicants various earlier patents and pending application referred to-above if further details are required.

In addition to controlling the engagement and disengagement of clutch 14 the control unit 36 also controls the throttle setting via control 37 when its control logic indicates that an override of the throttle opening set by the driver's operation of the accelerator 19 is desirable. In some applications the throttle control 37 may be omitted.

In accordance with the present invention the control unit 36 incorporates, in non-volatile memory, an operator warning routine (illustrated in flow diagram form in FIG. 2) which is invoked when the control system is keyed-on.

Figure 2:
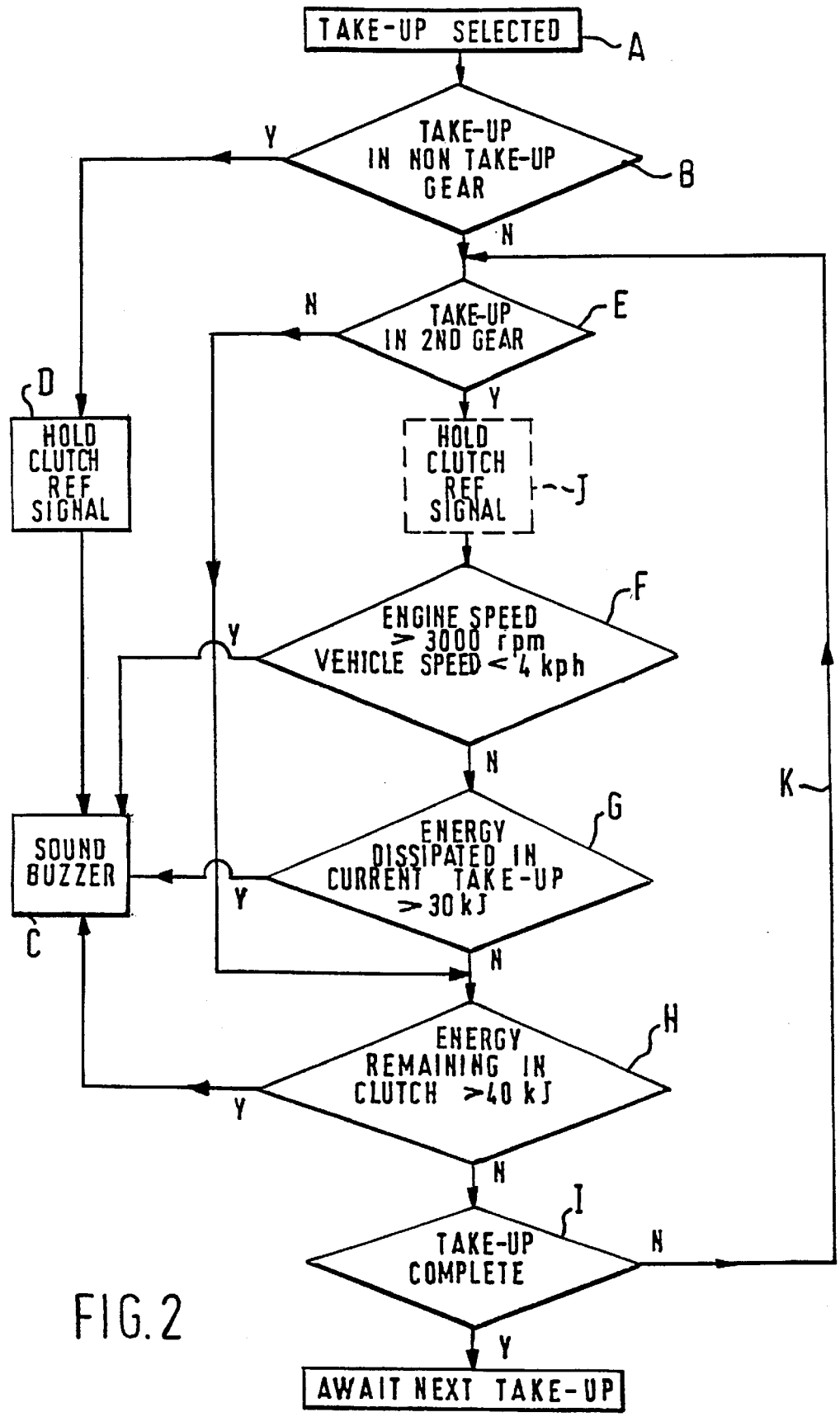
FIG. 2 shows in flow diagram form the operator warning routine of the present invention.

Referring to FIG. 2, at the start of each clutch take-up represented by the block A the operator warning routine checks at block B whether the operator has selected a non take-up gear to pull away in. A non take-up gear is defined as the third, fourth and fifth ratios in a five speed gearbox.

If an attempt is being made to pull away in a non take-up gear the buzzer 50 is sounded and/or an indicator light (not shown) is flashed as indicated at block C. Buzzer 50 does not sound simply because an inappropriate take up gear has been selected but sounds once take-up is under way in an appropriate gear. In this condition the buzzer sounds continuosly at an accelerator pedal depression of say more than 10 percent with a vehicle speed of say 4 kph.

Additionally the normal increase of the reference signal Vr with increasing engine throttle is prevented. (see block D) so that the reference signal remains substantially at its idle speed level. The effect of holding down the reference signal level is to promote rapid clutch engagement which will result in either jerky engagement, further notifying the operator that he has selected an inappropriate gear, or the stalling of the engine. In any event the rapid clutch engagement will minimise the energy dissipated in the clutch and thus reduce the likelihood of clutch facing damage due to excessive slippage over an extended period of time.

If the reference signal has increased significantly above idle speed before an abusive condition occurs, the system may be arranged in block D to reduce the reference signal back towards the idle level to again promote rapid clutch engagement.

As a further alternative, block D may be configured to promote rapid clutch disengagement in order to prevent the dissipation of excessive energy in the clutch. This rapid clutch disengagement is achieved by rapidly raising the value of the reference signal.

Additionally the operator warning routine checks at blocks E and F that any attempt to pull away in second gear is not abusive. Abuse in second gear is defined as a condition when the engine speed is high, e.g. 3000 rpm and above, and the vehicle speed is low, e.g. less than 4 kph. If block F identifies abuse in a second gear take-up the buzzer and/or flashing light is again activated continuosly as long as the 3000 rpm and 4 kph limits are exceeded.

A reference signal holding block J may be optionally included in the routine. This block acts to prevent increase in the reference signal in the event of an attempted take-up in second gear and operates in exactly the same manner as block D thus minimising energy dissipation in the clutch. As described above in relation to block D, block J may alternatively be configured to reduce the reference signal towards the idle signal to promote rapid clutch engagement or alternatively to rapidly increase the reference signal to promote rapid disengagement of the clutch.

At block G the operator warning routine includes a further check for second gear take-ups as to the total energy dissipated in the clutch during the current second gear clutch take-up. If this energy dissipation exceeds a predetermined level, e.g. 30 kJ, the buzzer/indicator light is again energised for a period of five seconds.

At block H the routine includes a further check, irrespective of the take-up gear selected, as to the total energy which remains dissipated in the clutch since the system was keyed-on.

The checks of block G and H are carried out in basically the same manner. Considering block H, the level of energy dissipated in the clutch is estimated by determining the current clutch slip speed from the difference between the engine speed Ve and the clutch driven plate speed Vdp. The instantaneous value is estimated by determining the current clutch slip speed from the difference between the engine speed Ve and the clutch driven plate speed Vdp. The instantaneous torque capacity of the clutch is also estimated by measuring the position of the clutch release fork 20 via the sensor 34. The control unit 36 includes a look up table which relates the clutch release fork position to the instantaneous torque capacity of the clutch.

By multiplying the current slip speed by the instantaneous torque capacity an estimate of the current power dissipation in the clutch is obtained. If this power dissipation is integrated over each clutch take-up cycle an estimate is obtained as to the total energy generated in the clutch due to all the clutch take ups which have occurred since the system was keyed-on.

The clutch has a natural tendency to cool due to conduction to, for example, the engine, flywheel, pressure plate etc. The clutch is also cooled by convection resulting from its rotation. Thus the total level of energy dissipated and still remaining within the clutch at any given moment since the system was keyed-on is obtained by decrementing the integration total by a predetermined amount (representative of the natural cooling rate of the clutch due to conduction and convection) on a regular periodic basis (typically once/second). This procedure gives a sufficiently accurate approximation to the total energy remaining within the clutch to provide an acceptable control variable.

As previously stated if this total level of energy remaining dissipated in the clutch exceeds a predetermined level of say 40 kJ the buzzer is sounded. Whilst the energy remaining dissipated in the clutch is above the 40 kJ level the buzzer will sound whenever further energy is dissipated in the clutch.

The block G estimation of the energy dissipated in a particular second gear take-up is carried out in the same manner as the block H estimation described above except that the period of integration and the period during which the integration total is decremented is the take-up period of the second gear take-up in question. Block G checks the integration total for the particular second gear take-up against the lower predetermined energy level of 30 kj.

Thus block H checks the total energy remaining in the clutch and block G checks the energy dissipated in the current second gear take-up only.

It will be understood that in both block G and H energy is dissipated in the clutch only during actual take-up of the clutch so that the integration total is incremented only during clutch take-up. The decrementing of the integration total (energy level estimate) of block H and the current second gear take-up of block G continues once every second either until the system is keyed off in the case of block H or until second gear is disengaged in the case of block G.

Second gear is subject to the additional check of block G because second gear is the easiest strictly non take-up gear to start in and therefore the most likely gear to be abused.

The warning routine of the present invention is only designed to be implemented on clutch take-ups from rest and not on clutch re-engagements which occur between gear changes.

At block I the routine checks that clutch take-up is complete using predetermined take-up completion criteria (see the Applicants co-pending UK patent application No. 94 02730.7 which gives details of suitable criteria).

The estimation of energy dissipation in both blocks G and H is repeated at a cycle frequency of say 100 cycles/second as indicated by return loop I in FIG. 2.

We claim:

1. A clutch control system for the automatic control of a motor vehicle clutch which connects an engine with a gearbox under the control of a gear ratio selector lever operated by a driver in a vehicle, the control system controlling both initial clutch take-up on starting of the vehicle, clutch re-engagement following each ratio change, clutch disengagement on movement of the gear selector lever to change the operative ratio of the gearbox, and clutch disengagement on the coming to rest of the vehicle, the improvement comprising: means to warn the driver of an attempt to drive away in any gear in an abusive manner determined by when the energy generated in any one particular take up is estimated to be above a predetermined level.

2. A clutch control system as claimed in claim 1, including designated non take up gears which are third gear and all higher gear ratios, when vehicle forward speed is below a predetermined level.

3. A clutch control system as claimed in claim 1 or wherein attempts to drive away in second gear or a higher gear with the engine speed (Ve) above a predetermined level and with vehicle forward speed below a predetermined level is regarded as abusive.

4. A clutch control system as claimed in claim 1 wherein attempts to drive away in any gear when the level of energy currently dissipated in the clutch (14) is estimated to be above a further predetermined level is also regarded as abusive.

5. A clutch control system as claimed in claim 1 wherein the level of energy currently dissipated in the clutch (14) is estimated by determining a clutch slip speed (Ve) from the difference between an engine speed and a clutch driven plate speed (Vdp), estimating the instantaneous torque capacity of the clutch from the position of a clutch actuator (22) using a look-up table, determining the instantaneous power being dissipated in the clutch from the product of the slip speed and torque capacity, integrating the instantaneous power dissipated over the time period under consideration to estimate the total energy generated, and subtracting periodically from this integration total an amount of energy representative of the natural cooling of the clutch to arrive at a current final total level of energy dissipated within the clutch during a time period under consideration.

6. A clutch control system as claimed in claim 1 wherein a level of clutch engagement is controlled by an electronic control unit (36) in response to an engine speed error signal derived from a comparison of current engine speed and a reference speed signal generated by the control unit, said error signal being compared with a current clutch position signal (Vc) to produce a clutch actuation signal (Vce), and in which if an attempt is made to move away in a non take-up gear or any gear in a predetermined abusive manner the reference signal is not allowed to increase above a predetermined level, as the engine speed increases thus causing an increase in engine speed error signal resulting in more rapid clutch engagement to reduce energy generation in the clutch (14).

7. A clutch control system as claimed in claim 6 wherein clutch engagement is controlled in second gear and all higher gear ratios.

8. A clutch control system as claimed in claim 6 in which if an attempt is made to move away in a non take up gear or any gear in a pre-determined abusive manner the reference signal decreases.

9. A clutch control system as claimed in claim 1 wherein a level of clutch engagement is controlled by an electronic control unit (36) in response to an engine speed error signal derived from a comparison of current engine speed and a reference speed signal generated by the control unit, said error signal being compared with a current clutch position signal (Vc) to produce a clutch actuation signal (Vce), and in which if an attempt is made to move away in a non take-up gear or any gear in a predetermined abusive manner the reference signal is increased rapidly thus causing a rapid clutch disengagement.

10. A clutch control system as claimed in claim 1 wherein the driver is warned by an audible and/or visual warning (50).

11. A clutch control system for the automatic control of a motor vehicle clutch which connects an engine with a gearbox under the control of a gear ratio selector lever operated by a driver in a vehicle, the control system controlling both initial clutch take-up on starting of the vehicle, clutch re-engagement following each ratio change, clutch disengagement on movement of the gear selector lever to change the operative ratio of the gearbox, and clutch disengagement on the coming to rest of the vehicle, in which a level of clutch engagement is controlled by an electronic control unit (36) in response to an engine speed error signal derived from a comparison of current engine speed and a reference speed signal generated by the control unit, said error signal being compared with a current clutch position signal (Vc) to produce a clutch actuation signal (Vce) the system including a control on clutch abuse which is provided if an attempt is made to move away in a non take-up gear or any gear in a predetermined abusive manner by not allowing the reference signal to increase above a predetermined level as the engine speed increases thus ensuring an increase in engine speed error signal resulting in more rapid clutch engagement thereby reducing energy generation in the clutch (14).

12. A clutch control system according to claim 11 wherein any attempt to drive away when the level of energy dissipated in the clutch (14) exceeds a predetermined level is designated as abusive and the level of clutch energy dissipated in the clutch (14) is estimated by determining the clutch slip speed from the difference between engine speed (Ve) and clutch driven plate speed (Vdp), estimating the instantaneous torque capacity of the clutch from the position of the clutch actuator (22) using a look-up table, determining the instantaneous power being dissipated in the clutch from the product of the slip speed and torque capacity, integrating the instantaneous power dissipated over the time period under consideration to estimate the total energy generated, and subtracting periodically from this integration total an amount of energy representative of the natural cooling of the clutch to arrive at a current final total level of energy dissipated within the clutch during the time period under consideration.

13. A clutch control system as claimed in claim 11 in which if an attempt is made to move away in a non take up gear or any gear in a pre-determined abusive manner the reference signal decreases.

14. A clutch control system for the automatic control of a motor vehicle clutch which connects an engine with a gearbox under the control of a gear ratio selector lever operated by a driver in a vehicle, the control system controlling both initial clutch take-up on starting of the vehicle, clutch re-engagement following each ratio change, clutch disengagement on movement of the gear selector lever to change the operative ratio of the gearbox, and clutch disengagement on the coming to rest of the vehicle, in which a level of clutch engagement is controlled by an electronic control unit (36) in response to an engine speed error signal derived from a comparison of current engine speed and a reference speed signal generated by the control unit, said error signal being compared with a current clutch position signal (Vc) to produce a clutch actuation signal (Vce) wherein a control on clutch abuse is provided if an attempt is made to move away in a non take-up gear or any gear in a predetermined abusive manner by rapidly increasing the reference signal to cause a rapid clutch disengagement.

* * * * *